United States Patent [19]

Wichterle

[11] 4,256,369
[45] Mar. 17, 1981

[54] TORIC HYDROGEL CONTACT LENS

[75] Inventor: Otto Wichterle, Prague, Czechoslovakia

[73] Assignee: SPOFA, spojene podniky pro zdravotnichou, Prague, Czechoslovakia

[21] Appl. No.: 33,322

[22] Filed: Apr. 25, 1979

[30] Foreign Application Priority Data

May 4, 1978 [CS] Czechoslovakia ............ 2855-78

[51] Int. Cl.³ .................................................. G02C 7/04
[52] U.S. Cl. ................................................... 350/160 H
[58] Field of Search ................................. 351/160–162

[56] References Cited

U.S. PATENT DOCUMENTS 3,660,545  5/1972  Wichterle ................. 351/160 H

OTHER PUBLICATIONS

Harris, et al., "Stability of Back-Toric Prism-Ballast Hydrogel Contact Lenses," *Amer. Jour. of Opt. and Phys. Optics,* vol. 55, No. 1. pp. 15–18.

*Primary Examiner*—John K. Corbin
*Assistant Examiner*—Scott J. Sugarman

[57] ABSTRACT

A toric hydrogel contact lens having an inner concave surface of the meniscus shape of a rotating liquid and the outer convex plane formed by a rotation-symmetric peripheric ring which passes to a central toric surface by means of two longitudinal strips having a toric component parallel with this component of the central surface, but of the opposite sign. These strips are linked up with the central surface in two parallel bands of mutual distance of at least 4 mm. Continuous transitions are formed between the rotation-symmetric peripheric ring, the central toric surface, and the longitudinal strips.

6 Claims, 4 Drawing Figures

TORIC HYDROGEL CONTACT LENS

The present invention relates to a toric contact lens, i.e. to the lens which corrects the insufficient visual acuity caused by astigmatism and in particular to a lens having a cylindric component of refraction, which refractivity is not constant in all planes passing through the optical axis, but has a maximum refractivity in one plane and a minimum refractivity in another plane perpendicular to the first plane.

The toric part of most known toric lenses extends from a central optic zone as far as to periphery, where it has no significance but, on the contrary, injures the regularity of the overall shape of lens. This irregularity may unfavourably affect the stabilization of lens axis in the eye. Besides, the edge thickness of these lenses is fairly uneven.

Toric hydrogel contact lenses have been manufactured solely by mechanical working of a dry hydrophilic material (xerogel). The toric plane (as a rule the outer plane) is obtained either by complex machining mechanisms, similar to that used in the production of toric spectacle glasses, or by the cylindric deformation of a prefabricated rotation symmetric lens and the rotation symmetric grinding of the lens in the deformed state. Both methods are very elaborate and expensive.

The object of this invention is to provide a toric hydrogel contact lens having an inner concave surface having a shape of a meniscus curvature obtained by a rotating liquid and, an outer convex plane having a rotating symmetric peripheric ring, a toric central part, two longitudinal strips, which have a toric-shaped component parallel with the toric component of the toric central part, but of the opposite sign. The longitudinal strips are linked with the central toric part by two parallel bands spaced from each other by a distance of at least 4 mm. Continuous transitions are thus formed between the rotation symmetric edge ring, the toric central part, and the longitudinal strips. Preferably the parallel strips are formed with concave recesses on the convex surface of lens only with lenses having a strong cylindric component of refraction. The lenses with a weak cylindric refraction, e.g. of one diopter only, are preferably formed with have only very slight deformation in the sense of concavity. In this case, the toric component of the strip does not produce explicit concavity, and the convexity of the lens is only decreased by the cylindric component of these transition strips.

To stabilize the cylindric axis of lens in an eye in accordance with the astigmatism axis of the eye, the toric lens according to the invention may have a part of the rotation-symmetrical edge ring interrupted by truncation along a chord or a line close to the chord (advantageously at one site or two opposite sites) or may be provided with at least one projection or thickness reduction formed on the outer convex plane.

For the purpose of stabilization of the cylindric axis in the eye, the toric lens may be further formed so that the axis of its inner concave meniscus surface is deviated up to 2 mm from the axis of symmetry of the peripheric rotation-symmetric edge ring. This causes increased thickness in one direction and a decrease in the opposite direction. If this lens is additionally truncated on the thicker side, the lens is even more precisely stabilized in an eye, similarly as are the lenses of the Concoid-Hydron type which are worked by turning (The Optician, Feb. 4, 1977, p.10).

An advantage of the toric contact lens according to the present invention consists in the construction which is excellently suitable for manufacturing by spin-casting. This method enables the formation of a very broad assortment of toric lenses at low production costs.

Because the edge of lens is formed by a regular rotation-symmetric ring, the position of lens in the eye is not affected by the lens toricity and can be successfully stabilized by the above mentioned methods.

The toric lens, prior to being furnished with any of the above mentioned stabilization means is particularly advantageous since it may be individually adapted for stabilization first according to the slope of cylindric axis of an astigmatic eye by cutting off part of the edge. To avoid the laborious determination of a position of lens axis by the physician, it is advantageous to furnish the lens with a colour marking showing the direction of cylindric axis.

The position of the cylindric axis may be also advantageously marked by rounded oblong projections made at the edge, in the plane of cylindric axis, preferably at opposite sides. Such projections can not irritate the eye-lid but permanently show the position of cylindric axis. A colour edge marking may be done in the proximity of one or both projections. The colour marking is preferably carried out in such way, as not to be not wiped off under physiologic conditions nor to contaminate the eye tissues, but to be removable by a simple chemical operation. Such dyeing may be achieved, for example, by diffusion of potassium permanganate into the lens and its subsequent reduction to colloidal brown manganese dioxide, e.g. by a reducing sugar which may be easily wiped off, by immersion of the lens into the solution of alkaline hydrogen sulphite and washing by physiologic saline. The lens which is already furnished with marking in the direction of cylindric axis, may also be marked on its edge with the basic date concerning the refraction marked on its edge. The lens marked in this way is advantageously transfered into the state, which allows easy grinding and the perfect polishing of the newly formed edge after grinding. Two forms of the lens are suitable for this purpose: 1. the dry form of lens in the perfectly relaxed state (the form of xerogel replica), or 2, the lens in dry state, which was transfered into a planarized form.

The lens marked with the position of the axis and with the refraction data is particularly advantageous when the handling of a large number of relatively slightly different toric lenses is required during fitting to a patient, since such lenses cannot be confused.

The colour marking may be also made by other inorganic pigments, which can be developed in a gel, or by organic dyes. On the one hand, organic dyes have the disadvantage being of washed out during storage of the lens in swollen state, on the other, their advantage is that they can be removed by suitable chemical agents. Because the dyeing is mainly significant, only for a short time during the application of lens, the former disadvantage is not critical.

The invention is set forth in more details in the following description and in the accompanying drawings.

Figure 1:
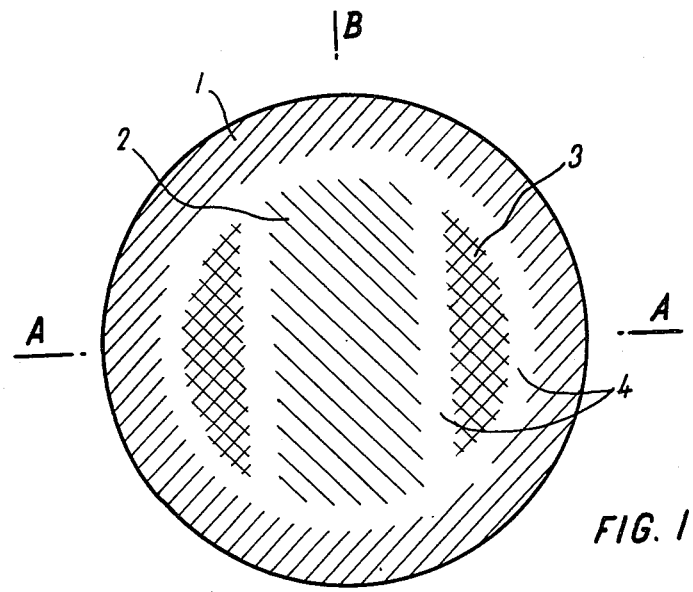
FIG. 1 is a plan view of the outer surface of toric lens.
Figure 2:
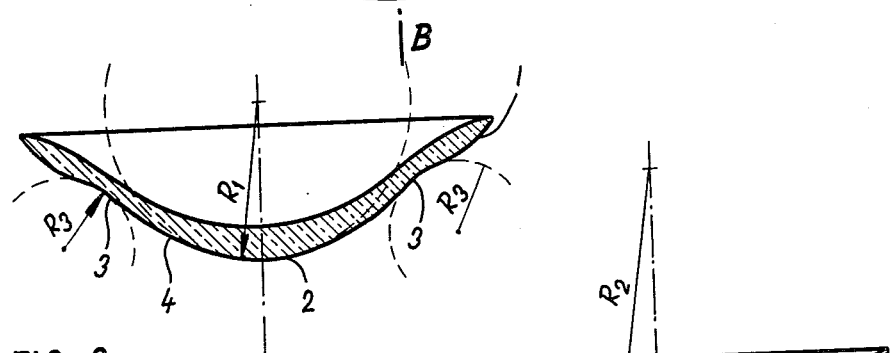
FIG. 2 is sectional view taken along line A—A of FIG. 1.
Figure 3:
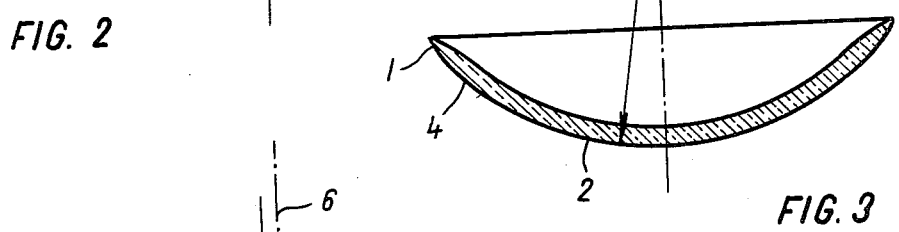
FIG. 3 is a sectional view taken along line B—B of FIG. 1.
Figure 4:
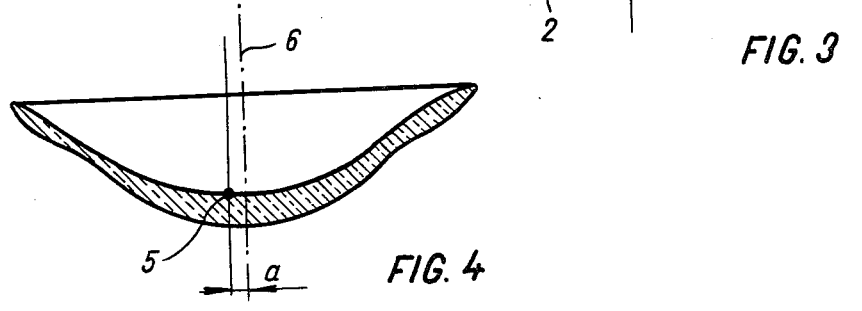
FIG. 4 is a sectional view through a toric lens in the plane of deviation of the internal meniscus axis from the optical axis of the outer surface.

As seen in the Figures, the toric lens of the present invention comprises a unitary gel body having an inner concave surface in the shape of a meniscus obtained by a rotating liquid, and an outer convex surface. The outer surface has a peripheral ring portion 1 which is rotation-symmetric about a central axis 6 (FIG. 4), a toric central portion 2 having a maximum radius curvature R1 in the plane passing through to section lines A—A, and a minimum curvature in the plane passing through the section lines B—B. Two roughly cylindrically concave strips 3 extend parallel to the plane of minimum curvature on either side of the toric portion 2 being spaced from each other distance corresponding to the width of the optical zone, i.e., at least 4 mm., but preferably 7–9 mm. The peripheral ring portion 1, the central toric portion 2 and the cylindrical concave strips 3 are linked tangentially by continual transition zones 4 so that the interfaces therebetween are not sharp. The transition zones are preferably between 0.5 to 2 mm. This shaping produces only minimum irritation to the eye and its lids by the outer surface of the lens.

The toric part 2 has a surface in the plane of maximum curvature wherein the central radius of curvature has the minimum value R1, and in a plane of minimum curvature the central radius of curvature has the maximum value R2. The cylindrical concave strips have a radius of curvature R3.

For the sake of clarity the drawings show a lens having an extraordinary strong component of cylindric refraction and where the parallel cylindric planes 3 exhibit a deep concavity. For lenses of a more common type, particularly for the lenses with a low dioptric value of the cylindric component of refraction, the shape of the parallel cylindric stripe 3 can be formed with a very slight concavity so that the lens surface only have a slight diviation from its rotation-symmetric shape of the cylindric component does not cancel the lens convexity at this site, but only decreases the convexity.

To stabilize the cylindric axis in an eye, the center 5 of the inner meniscus surface of lens (FIG. 4) may be deviated from the axis 6 of the rotation-symmetric peripheric ring of outer surface. According to FIG. 4, this deviation lies precisely in the plane of maximum curvature A—A. However, the plane of this deviation is given by the distance of the center 5 of inner meniscus from the axis 6. The extent of deviation is less than 2 mm as a rule.

The lens is particularly suitable for manufacture by centrifugal spin casting methods wherein the mold surface for the outer convex surface of the lens can be formed in the shape desired.

EXAMPLE

A toric lens, is prepared from a water-swollen glycol methacrylate gel of a water content 40% having in the swollen state a circular base of diameter 13.8 mm. Its inner concave surface has the shape of a rotation meniscus of the sagital depth 3.15 mm and the central radius of curvature 7.4 mm. Extending to a diameter of 6 mm, this surface has the shape of an ellipsoid, which is extended in the direction of optical axis and has the ratio of its semi-axis 1 : 2.2. Further from the center, the inner surface gradually passes into the shape of hyperboloid and has the form of cone of the diameter of 12 mm. Closer to the periphery, the ionical surface passes into a negatively curved meridian. The outer convex surface has a peripheral ring in the form of a sphere of radius 8.5 mm. The circumferential ring is then continuously linked with the central toric surface in part directly, and in part by means of two parallel moonshaped strips, the shape of which is slightly concave cylindric in the main. The central toric surface occupies a inner part of the lens of a band 8 mm wide and about 10 mm long. It has a central radius 8.5 mm in its longitudinal axis and a central radius of curvature 7.3 mm in the perpendicular direction. The central thickness of lens is 0.3 mm. The lens exhibits the refraction of −6.8 diopters in the longitudinal axis of toric band and the refraction of +0.5 diopters in the transverse direction.

I claim:

1. A toric hydrogel contact lens comprising a concave inner surface having a shape of a meniscus obtained by a rotating liquid and an outer convex surface having a rotation-symmetric peripheral ring, a toric central part and two longitudinal strips which have a cylindric component parallel to the central toric part but of the opposite sign, said longitudinal strips being linked with its central part by parallel bands spaced one from the other at least 4 mm., said peripheric ring, said toric central part and said longitudinal strips being linked by continuous transition bands.

2. The lens according to claim 1 having at least one projection or thickness reduction on its outer convex surface.

3. The lens according to claim 1, wherein a portion of the peripheric ring is truncated along a straight or slightly curved chord.

4. The lens according to claim 1, wherein the center of its inner concave surface diameter is up to 2 mm from the axis of symmetry.

5. The lens according to claim 1, 2, 3, or 4 wherein the lens is provided with indicia showing at least one of the positions of cylindric axis, and the data of refraction.

6. The toric hydrogel contact lens according to claim 5 wherein said indicia is differentiated from the lens by colour.

* * * * *